May 9, 1967 W. J. FANNING 3,317,982

METHOD OF MASKING HOLES IN CAPACITOR BODIES

Filed July 29, 1964

INVENTOR
W. J. FANNING
BY A. C. Schwarz, Jr.
ATTORNEY

United States Patent Office 3,317,982

Patented May 9, 1967

3,317,982

METHOD OF MASKING HOLES IN CAPACITOR BODIES

William J. Fanning, Melrose Park, Ill., assignor to Western Electric Company, Incorporated, New York, N.Y., a corporation of New York Filed July 29, 1964, Ser. No. 385,868
3 Claims. (Cl. 29—25.42)

The present invention relates generally to a method of masking holes in capacitor bodies, and more particularly to a method of masking arbor holes remaining in wound capacitor bodies in preparation for subsequent operations. A general object of the invention is to provide a new and improved method of such character.

In the manufacture of capacitors, alternate webs of a dielectric material and a conductive material are wound on an arbor to form a capacitor body with alternate conductive layers each exposed at an opposite end of the capacitor body. Solder end-caps are subsequently sprayed on either end of the capacitor body and leads attached thereto, after which a tape is wound about the capacitor body and the ends filled with an epoxy resin which is then cured to seal the capacitor. As a consequence of initially forming the capacitor body on a winding arbor, the resulting wound capacitor body has a central opening extending therethrough, and unless this opening (termed an "arbor hole") is masked or plugged, solder or epoxy resin may enter the same and cause a direct short or other defect in the finished capacitor.

Accordingly, it is an object of the invention to provide a new and improved method for masking arbor holes remaining in wound capacitor bodies in preparation for solder end-capping, lead-attaching and end-filling operations.

The problem of masking arbor holes in wound capacitor bodies has been a particularly acute problem in the capacitor manufacturing art for many years, and various elaborate and sophisticated masking devices and techniques have been contrived. Such devices and techniques are generally designed to mask the arbor holes only temporarily—that is, during a particular one of the succeeding operations, after which it is removed. Other known techniques provide for the insertion of rigid plugs in the ends of the arbor hole. The arbor holes, however, vary greatly in configuration, consequently such rigid plugs often do not conform to the configuration thereof and if forced into the holes, may vary the capacitance appreciably. The advantages and savings derived from permanent masking techniques, employing deformable plugs are indeed obvious.

It is therefore another object of the invention to provide a new and improved method of masking arbor holes remaining in wound capacitor bodies in preparation for solder end-capping, lead-attaching and end-filling operations, wherein a simple and very practical expedient is provided for permanently masking the arbor holes, wherein a quasi-plastic masking material is employed which readily conforms to the configuration of the arbor holes, and wherein the masks become an integral part of the finished capaictor without any deleterious effects thereon.

A method accomplishing the above objects and advantages in accordance with the invention includes the step of plugging both ends of an arbor hole remaining in a wound capacitor body with a deformable, non-conductive material which readily conforms to the configuration of the arbor hole and adheres to the capacitor body so that the hole is completely closed off at both ends, whereby permanent masks are provided which become an integral part of the finished capacitor.

Preferably, the method of masking arbor holes is incorporated in a process for manufacturing capacitors wherein alternate dielectric and conductive webs are wound on an arbor to form a capacitor body with alternate conductive layers each exposed at an opposite end of the capacitor body, solder end-caps are sprayed on either end, leads are attached to the solder end-caps, and a tape is wrapped about the capacitor body, after which an end-filling material is applied and cured to seal the ends of the capacitor.

The improved method provides for the additional step of permanenty masking the arbor hole remaining in the wound capacitor bodies prior to the solder end-capping operation, by plugging both ends of the hole with a quasi-plastic, non-conductive material which readily conforms to the configuration of and completely closes off the hole. Best results are obtained if the plugging material is capable of adhering to the capacitor body and withstanding minor pressures, and if it is substantially inert with respect to the materials of the capacitor body. The masks thus provided preclude solder or end-filling material from entering the hole in subsequent operations, and become an integral part of the finished capacitor without any deleterious effects thereon.

The above and other objects, advantages and aspects of the invention will become apparent from the following detailed description of a specific embodiment thereof when taken in conjunction with the appended drawing in which.

Figures 1, 2, 3:
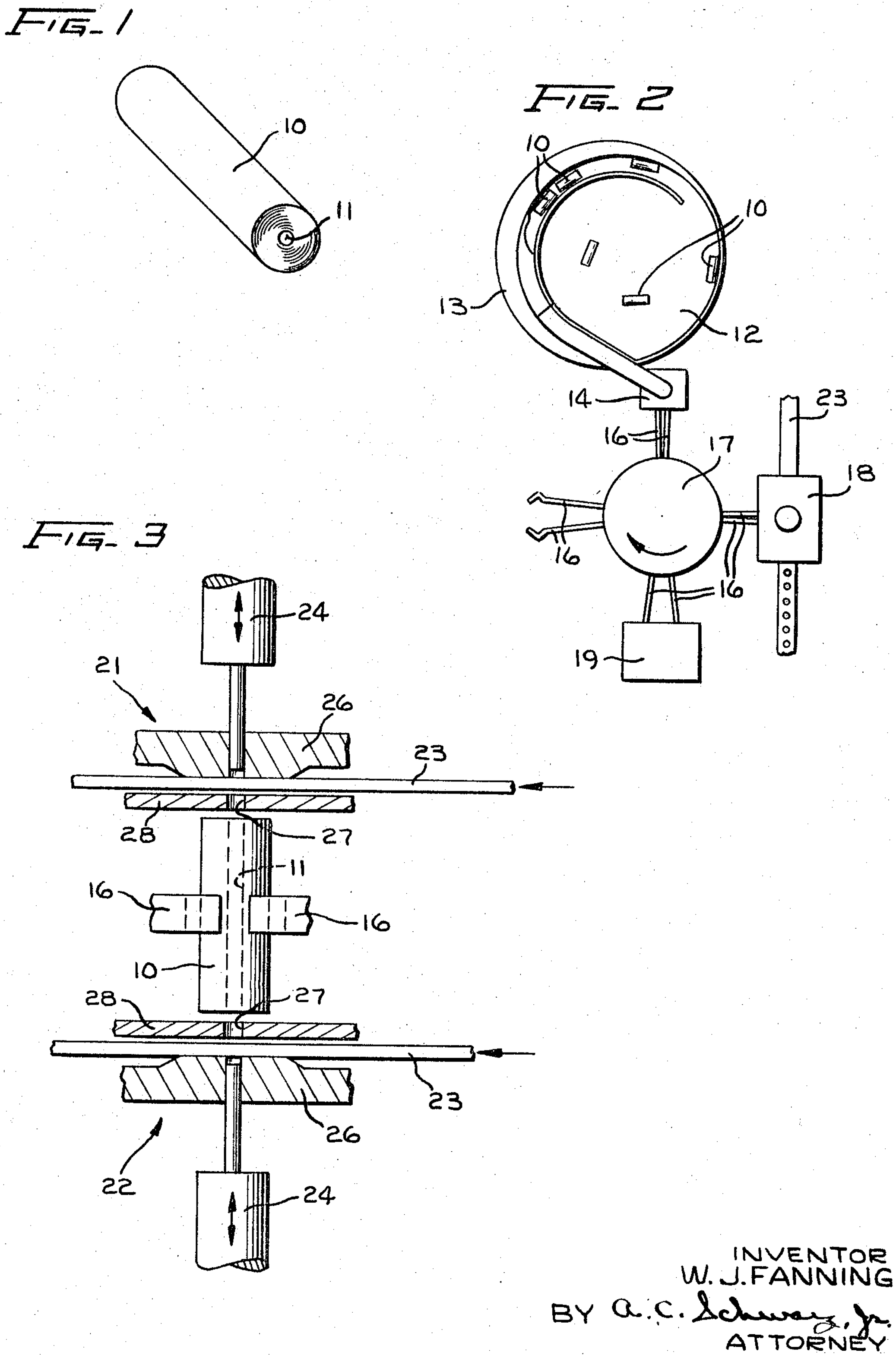
FIG. 1 is a perspective view of a wound capacitor body prior to the solder end-capping and other subsequent operations.
FIG. 2 is a diagrammatic plan view of apparatus for automatically masking the arbor holes in acordance with the invention.
FIG. 3 is an enlarged, fragmentary elevational view, partly in section, of the automatic masking apparatus illustrated in FIG. 2.

Turning now to the drawings and specifically to FIG. 1, a capacitor body 10 is initially formed by winding alternate webs of dielectric and conductive materials about a winding arbor (not shown) so that each alternate conductive layer is exposed at an opposite end of the capacitor body. Each succeeding convolution is wound tightly over the preceding one so that no gaps or openings form between the layers; however, the arbor itself, of necessity, leaves the wound capacitor body 10 with an opening 11 extending axially therethrough. This opening 11 (termed an "arbor hole") must be masked or plugged during subsequent operations performed on the capacitor body 10 or else a defective capacitor will result.

For example, solder end-caps are provided in the next stage of production by spraying the solder on both ends of the capacitor body. Obviously, if the arbor hole 11 is not masked, the solder could form a direct short across the capacitor body. Another possibility is encountered after leads are attached to the solder end-caps and a protective tape wound about the capacitor body, when an end-filling material is applied. Unless properly masked, the end-filling material would leak through the arbor hole 11, resulting in a defective end-seal for the finished capacitor.

It is therefore necessary that the arbor hole be plugged or masked in some manner to avert the above possibilities. The solution provided by the present invention is a method wherein the arbor hole 11 is plugged at either end of the capacitor body 10 with a quasi-plastic or putty-like material which readily conforms to the configuration of the arbor hole 11 and adheres to the capacitor body 10. It is an important feature of this method that the masks thus provided become a permanent part of the finished capacitor without in any way deleteriously affecting the same. In order to handle a large number of capacitor bodies on a mass production basis, an automatic masking apparatus, illustrated in FIG. 2, was developed and practices the techniques of the present invention.

As shown in FIG. 2, the wound capacitor bodies 10—10 are initially placed in mass in a bowl 12 of a Syntron vibratory feeder 13 which feeds the capacitor bodies to a loading apparatus 14. The loading apparatus 14 operates to insert a capacitor body 10 in each of a plurality of pairs of clamping members 16—16 circumferentially spaced about the periphery of a rotary conveyor 17, a biasing mechanism (not shown) being allowed to close the clamping members 16—16 to a clamping position as the loading apparatus 14 inserts a capacitor body therebetween. The rotary conveyor 17 indexes the capacitor body 10 to an apparatus 18 which automatically plugs the arbor hole 11 at both ends of the capacitor body 10 simultaneously, after which the capacitor body 10 is indexed to an automatic ejection station 19 whereat the clamping members 16—16 are cammed apart so that the capacitor body 10 falls by gravity into a repository (not shown).

As a capacitor body 10 is indexed to the plugging station, the capacitor body 10 is aligned between opposed heads 21 and 22 of the plugging apparatus 18, as shown in FIG. 3. In each of the plugging heads 21 and 22, a strip 23 of the plugging material is intermittently advanced therethrough so that a reciprocable punch 24 mounted in a guide 26 may punch a portion of the material through a cavity 27 in a die 28. The punch 24 continues through the die 28 to force the material into the arbor hole 11 in the associated end of the capacitor body 10, the punch being slightly larger than the arbor hole 11 so that the material is forced to conform to the configuration of the arbor hole and completely close-off the same. Both heads 21 and 22 operate simultaneously to plug the corresponding end of the arbor hole 11, and hence each punch 24 forms a back-up member to hold the capacitor body against the force of the other punch 24.

It is important that the material utilized to plug the arbor hole 11 have certain properties. For example, the material used must be non-conductive and must be substantially inert with respect to the materials of the capacitor body 10 so as not to react therewith. This latter consideraion is critical because the masking material becomes an integral part of the finished capacitor; thus, if the material reacts even at a very slow rate with the materials of the capacitor body, the capacitor will eventually break down. It is also important that the plugging material be quasi-plastic in texture, and that it be capable of adhering to the capacitor body and withstanding minor pressures, so that the material readily conforms to the configuration of the arbor hole 11 and effectively closes it off at either end of the capacitor body 10.

Alkyd putty was found to have the above properties, and is advantageously adaptable to the above process. One advantageous feature of alkyd putty is that it may be formed into a strip and wound on a supply spool (not shown), from which it may be intermittently advanced to an associated one of the plugging heads 21 or 22. Further, the unused portions of the strip 23— that is, the strip remaining after portions have been punched out—are readily reclaimable and may be reformed into a strip for repetitive use.

With the above technique, therefore, a permanent mask is provided at either end of the arbor hole 11 remaining in a wound capacitor body 10. These masks preclude solder or end-filling material from entering the hole and causing a direct short or other defect in the finished capacitor during subsequent operations. In addition, the masks become a permanent part of the finished capacitor and thus eliminate the necessity of using temporary masking devices and removing them again after each operation. Hence, a simple and very practical expedient has been developed whereby arbor holes in capacitor bodies may be permanently masked, which masks become an integral part of the finished capacitor without any deleterious effects thereon.

While one specific embodiment of the invention has been described in detail hereinabove, various modifications may be made without departing from the spirit and scope of the invention, and it is intended that all such modifications be interpreted as contemplated by the invention.

What is claimed is:

1. A method of plugging the end of a hole formed in a wound capacitor by an arbor during the winding of the capacitor which comprises:

forming a strip of plastically deformable dielectric material from which closure plugs may be punched for filling the ends of the holes;

placing a strip and a capacitor in a die and in the path of a punch having a flat end which is slightly larger than the cross section of the hole in the capacitor and with the end of the capacitor adjacent the strip and in alignment with the punch; and punching a closure plug of the plastically deformable dielectric material from the strip and deformably pressing the closure plug into the hole with the punch until the outer end of the plug becomes flat and flush with the end surface of the capacitor.

2. A method of closing the ends of holes formed in wound capacitors by an arbor during the winding of the capacitors which comprises:

forming strips of plastically deformable dielectric material from which closure members may be formed for filling the ends of the holes;

orienting a capacitor and a pair of the strips of dielectric material with the strips, respectively, disposed adjacent the ends of the capacitor;

engaging the strips, respectively, with a flat surface of a punch which is slightly larger than the cross section of the hole in the capacitor and punching from the strip a closure member of the plastically deformable dielectric material which is also slightly larger than the cross section of the hole of the capacitor and moving the punch so that its flat surface pushes the closure member and deformably forces it into the hole, causing it to conform thereto and engage the wall thereof, until the outer end of the closure member becomes flat and flush with the end surface of the capacitor.

3. A method of closing the ends of holes formed in wound capacitors by an arbor during the winding of the capacitors which comprises:

forming strips of plastically deformable dielectric material from which closure members may be formed for filling the ends of the holes;

advancing successive capacitors to and supporting each of them in a work station;

advancing a pair of the strips of plastically deformable dielectric material intermittently at the work station on opposite sides of and adjacent to the ends of the capacitor thereat; and engaging the strips, respectively, at the work station with a flat surface of a punch which is slightly larger than the cross section of the hole in the capacitor and punching a closure member from the strip and moving the punch so that its flat surface pushes the closure member and deformably forces it into the hole, causing it to conform thereto and engage the wall thereof, until the outer end of the closure member becomes flat and flush with the end surface of the capacitor.

References Cited by the Examiner

UNITED STATES PATENTS

| | | | |
|---|---|---|---|
| 1,652,595 | 12/1927 | Weeks | 53—297 X |
| 2,003,682 | 6/1935 | Enock | 53—296 X |

FOREIGN PATENTS

| | | |
|---|---|---|
| 716,917 | 10/1954 | Great Britain. |

References Cited by the Applicant

UNITED STATES PATENTS

| | | |
|---|---|---|
| 2,345,852 | 4/1944 | Langkammerer. |
| 2,942,302 | 6/1960 | Beyer. |

JOHN F. CAMPBELL, *Primary Examiner.*

WILLIAM I. BROOKS, *Examiner.*